Feb. 28, 1950  C. N. KIMBALL ET AL  2,499,069
METHOD OF TESTING MOISTURE CONTENT OF MATERIALS
Filed May 5, 1947
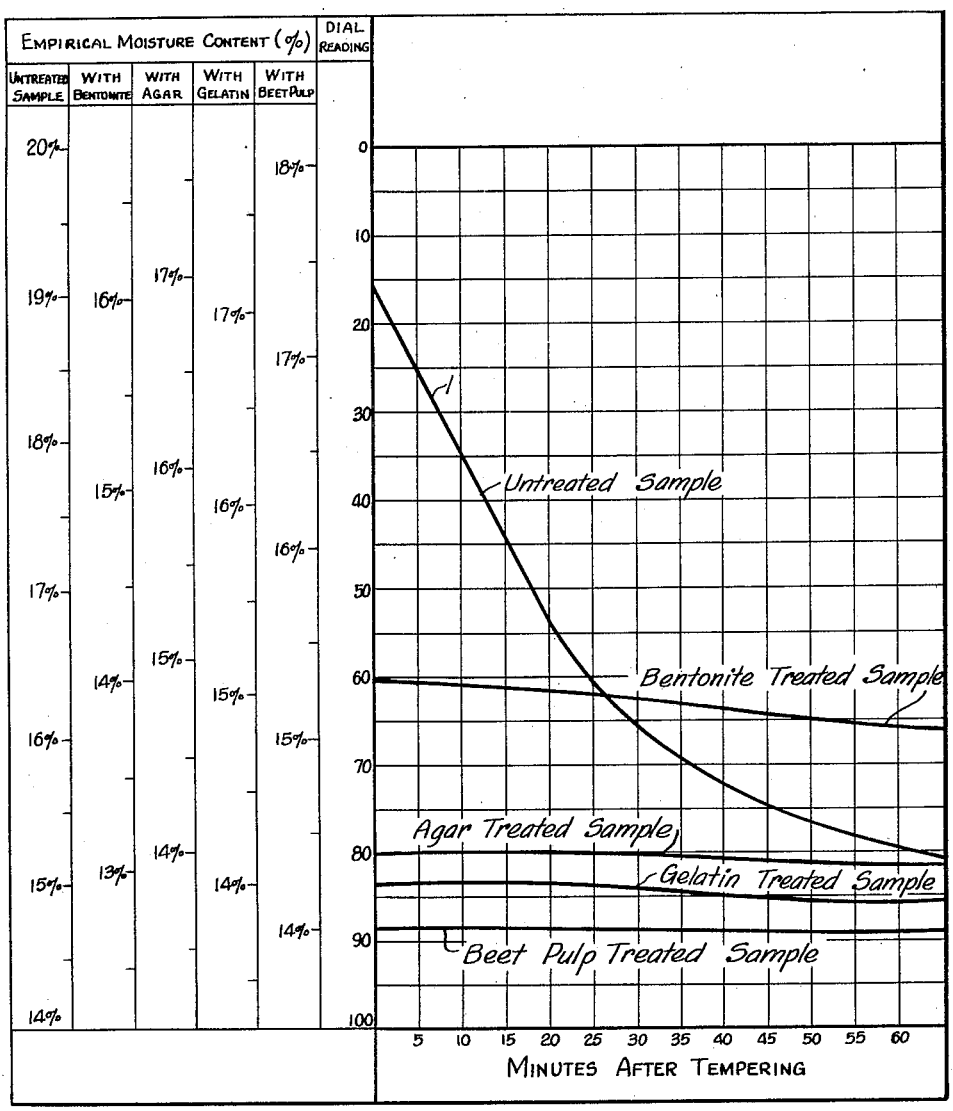
INVENTORS.
Charles N. Kimball
William R. Lewis
Herman A. Strecker
BY Thos. E. Scofield
ATTORNEY.

Patented Feb. 28, 1950

2,499,069

UNITED STATES PATENT OFFICE 2,499,069

METHOD OF TESTING MOISTURE CONTENT OF MATERIALS

Charles N. Kimball, Johnson County, Kans., William R. Lewis, Clay County, Mo., and Herman A. Strecker, Wyandotte County, Kans., assignors to C. J. Patterson Company, Kansas City, Mo., a corporation of Missouri Application May 5, 1947, Serial No. 746,098

9 Claims. (Cl. 175—183)

The present invention relates in general to the measurement of the moisture content of materials and deals more particularly with a method for measuring the moisture content of freshly tempered cereal grains, such as wheat, rye, barley, oats, sorghum and corn, for example.

The tempering of cereal grains is a practice commonly employed in the milling industry and it consists simply in adding water or other liquid to the material for the purpose of softening the outer shell of the individual kernels preparatory to milling. The process frequently is carried out on a continuous basis by feeding the grain through a screw conveyor and at the same time introducing water continuously into the conveyor tube by means of a suitable pipe connected thereto, the material issuing from the conveyor then being stored in bins for 12 to 20 hours before it is milled.

For optimum milling properties it is important that the material have a predetermined moisture content after tempering, or at least a moisture content falling within a predetermined limited range. Cereal grains received for tempering at different times naturally do not always have the same initial moisture content or the same absorption characteristics and accordingly it will be evident that if the final product is to have the desired moisture content the increase in moisture brought about in the tempering process must be controllable, say by adjusting the speed of the conveyor or the rate at which the water is added thereto, or both. Unfortunately, proper control of these factors has been extremely difficult to achieve in the past due to the fact that it has been impossible as a practical matter to make a determination of the moisture content of the freshly tempered material in sufficiently short time to permit correcting the adjustment of the tempering process in the event the moisture content was above or below the desired level. Well known methods for moisture determination which employ the principle of crushing the grain sample after tempering, heating it and measuring its loss in weight have been employed, but these methods have the disadvantages of requiring that the grain be crushed or ground and further are relatively slow, i. e., an hour or so is consumed. The use of electrical moisture meters employing either the conductivity or dielectric constant principle has been limited to the measurement of moisture content of the tempered material only after the aforementioned storage period of 12 to 20 hours, at which time it obviously is too late to correct any errors that may have been made in carrying out the tempering process.

With these facts in mind it is the primary object of the present invention to make possible the reliable determination of the moisture content of freshly tempered cereal grains.

More specifically, it is an object of the invention to provide a process whereby the moisture content of freshly tempered cereal grains may be determined by means of any conventional type of moisture meter having electrodes between which a sample of the material is disposed for purposes of electrical measurement. Such meters ordinarily are controlled by the electrical characteristics (e. g., resistance, reactance or dielectric constant) of the sample between the electrodes, one suitable form of apparatus being shown in our copending application, Serial No. 744,120, filed April 26, 1947.

We have discovered that the inability of these meters to give an accurate indication of the moisture content of freshly tempered material is due largely to the fact that when the material is initially wetted the moisture resides for the most part on the surface of the individual berries or kernels, whereas with the passage of time it infiltrates or advances progressively toward the center of the berry until it finally reaches a fairly uniform state of distribution. In the period during which the progressive change in the geometric distribution of the moisture is taking place there is a corresponding progressive change in electrical characteristics such as resistance, reactance and dielectric constant of the material. As a result, measurements of moisture content predicated upon these electrical characteristics will change quite rapidly during the first few hours following tempering and will not become sufficiently constant to be reliable until 12 to 20 hours have elapsed.

Our invention comprises a method of treating a sample of freshly tempered cereal grain so as to halt or greatly retard the infiltration of moisture into the kernels in order to stabilize that electrical characteristic of the sample which serves to control the reading of the moisture meter. An important feature resides in effecting an arbitrary redistribution of the added moisture in the sample of freshly tempered material in such a way as to obtain an immediate reading on the moisture meter closely approximating or bearing a predetermined relationship to the reading which would be obtained if the material were stored for 12 to 20 hours before the measurements were made.

In practicing our invention we mix with a sample of the freshly tempered stock a small proportion of dry, finely granulated or pulverulent non-ionic material (or materials) capable of absorbing the moisture on the surface of the kernels. The mixture is agitated, for example by shaking, whereby substantially all of the surface moisture on the kernels is taken up by the absorbent material; the mixture then is placed between the test electrodes of the moisture meter in conventional fashion. Inasmuch as there no longer is a concentration of moisture on the surface of the kernels progressive infiltration takes place so slowly as to be almost imperceptible. At the same time all of the original moisture is retained in the mixture in substantially uniform distribution throughout the absorbent material whereby the reading obtained on the moisture meter closely approximates the reading which would be obtained if the original tempered stock were simply allowed to stand until the distribution of moisture in the kernels had become uniform.

The absorbing agent may be any one of a number of materials or mixtures, for example, bentonite, agar, gelatin or pulverized beet pulp, to name but a few.

The drawing which accompanies this specification shows graphically the results obtained by the use of the above four materials in connection with moisture tests made on freshly tempered wheat. The wheat employed for these tests came from the same lot, the original moisture content of which was 12.5%; and the five samples underwent identical treatment in the tempering process preparatory to being tested. One of the samples had no absorbent material added thereto at the end of the tempering operation and moisture tests made on this sample at five-minute intervals with the apparatus disclosed in our copending application, Serial No. 744,120, yielded the curve identified by reference numeral 1. To each of the remaining four samples there was added one part of absorbent material (bentonite in one case, agar in the second case, gelatin in the third and beet pulp in the fourth) to 10 parts of wheat by weight, the mixture being shaken vigorously for a minute or so and then having its moisture content measured at intervals in the same way as the first sample. The absorbent material in each instance was sufficiently fine to pass a 200 mesh sieve and originally contained less than 5% moisture by weight.

It will be observed that during the first hour after tempering (the very period during which knowledge of moisture content is most vital) the readings obtained on the untreated sample changed so rapidly that a measurement taken at any particular instant would furnish no reliable indication of what the ultimate or true moisture content of the sample would be. On the other hand, the readings taken on each of the other four samples remained comparatively constant during this period, clearly demonstrating the stabilizing effect of the absorbent material which had been added in each case.

While the different absorbent materials are much alike in their stabilizing influence it will be observed that the absolute readings obtained vary with the material used even though the same meter was employed in all instances. This is due to the fact that all of the absorbent materials were added to the tempered wheat in the same proportions by weight; the more fluffy materials (such as beet pulp) thus were present in greater relative volume than less fluffy materials (such as bentonite) and, consequently, produced a greater reduction in the dielectric constant of the mixture.

The relationship between the true moisture content of the tempered wheat and the stabilized meter reading obtained with the aid of any one of the absorbent materials as described above can be determined by experience and is simply a matter of calibration. If desired, variations in the initial moisture content of the grain (i. e., the moisture content before tempering) may be taken into consideration in the calibration, for instance by preparing different conversion tables, charts or curves corresponding to different initial moisture contents, each said table, chart or curve being suitable for converting a numerical reading obtained on the freshly tempered stock with a particular moisture meter and a particular absorbent material into an empirical value or per cent moisture. A similar adjustment may be made for variations in the initial moisture content of the absorbent material but it is preferred always to use material having an initial moisture content of 5% or less in order to avoid the necessity of making such an adjustment; the absorbent material may be stored in hermetically sealed capsules, for instance, each capsule containing the amount needed for stabilizing one test specimen of freshly tempered stock.

From the foregoing it will be seen that this invention is one well adapted to attain all of the ends and objects hereinbefore set forth together with other advantages which are obvious and which are inherent to the process.

Inasmuch as many possible absorbent materials may be employed in practicing the invention and certain variations may be made in the use of these materials without departing from the scope of the invention, it is to be understood that all matter herein set forth is to be interpreted as illustrative and not in a limiting sense.

It will be understood that certain features are of utility and may be employed without reference to other features. This is contemplated by and is within the scope of the appended claims.

Having thus described our invention, we claim:

1. The method of testing freshly tempered cereal grain which comprises removing the surface moisture from the individual berries in a sample lot and redistributing it throughout the spaces between the berries, then placing the sample lot between a pair of electrodes and registering an electrical characteristic of the sample between said electrodes.

2. The method of testing freshly tempered cereal grain which comprises mixing with a sample thereof an absorbent material, placing the mixture between a pair of electrodes and registering an electrical characteristic of the mixture between said electrodes.

3. A method as in claim 2 wherein said absorbent material comprises approximately 10 per cent of the mixture by weight.

4. A method as in claim 2 wherein said absorbent material comprises finely divided solid material of such particle size as to pass a 200 mesh sieve.

5. A method as in claim 2 wherein said absorbent material comprises finely divided solid material having an initial moisture content of less than five per cent.

6. A method as in claim 2 wherein said absorbent material comprises bentonite.

7. A method as in claim 2 wherein said absorbent material comprises agar.

8. A method as in claim 2 wherein said absorbent material comprises beet pulp.

9. The method of testing freshly tempered cereal grain which comprises mixing with a sample thereof pulverulent absorbent material in such quantity as to substantially fill the spaces between the berries, placing the mixture between a pair of electrodes, and registering an electrical characteristic of the mixture between said electrodes.

CHARLES N. KIMBALL.
WILLIAM R. LEWIS.
HERMAN A. STRECKER.

REFERENCES CITED

The following references are of record in the file of this patent:

UNITED STATES PATENTS

| Number | Name | Date |
|---|---|---|
| 1,826,247 | Heppenstall | Oct. 6, 1931 |
| 1,895,118 | Allen | Jan. 24, 1933 |
| 2,373,846 | Olken | Apr. 17, 1945 |
| 2,382,168 | Oxley et al. | Aug. 14, 1945 |